United States Patent [19]

Young

[11] 3,755,731

[45] Aug. 28, 1973

[54] SYSTEM FOR DETECTING DROPOUT AND NOISE CHARACTERISTICS OF MAGNETIC TAPE WITH SWITCH MEANS TO SELECT WHICH CHARACTERISTICS TO BE DETECTED

[75] Inventor: Frank Young, San Diego, Calif.

[73] Assignee: The United States of America as represented by the Secretary of the Navy, Washington, D.C.

[22] Filed: Jan. 10, 1972

[21] Appl. No.: 216,673

[52] U.S. Cl. 324/34 TA, 179/100.2 B, 340/146.1 E

[51] Int. Cl. .......... G01r 33/12

[58] Field of Search .......... 324/34 R, 34 TA; 340/146.1 E, 146.1 F; 179/100.2 B

[56] References Cited

UNITED STATES PATENTS

| | | | |
|---|---|---|---|
| 2,793,344 | 5/1957 | Reynolds | 324/34 TA |
| 3,530,384 | 9/1970 | Zussman | 324/34 TA |
| 3,536,994 | 10/1970 | Johnson | 324/34 TA |

*Primary Examiner*—Robert J. Corcoran
*Attorney*—R. S. Sciascia, G. J. Rubens et al.

[57] ABSTRACT

Data bits represented by magnetic flux reversals at substantially each one-half cycle of uniform data periods are recorded on each of a plurality of data channels of the magnetic tape which is to be tested for dropout and noise characteristics. The recorded data bits on each of the plurality of data channels are then detected by a suitable means such as a read-write head. The detected data bits for each channel are connected as the input to a bistable means which in turn provides one of the inputs to an associated sampling gate employed for the purpose of detecting each dropout of a data bit for each channel. All channels are connected in common to an appropriate means for generating a timing signal in response to the first received output signal from the detected data bits. The timing signal is used to develop a first delay of less than one-half of the data period of the originally recorded data and applied to the sampling gates as their second input, actuating each non-inhibited sampling gate to produce a dropout error signal. The timing signal also is used to develop a second delayed signal which is connected to reset the bistable means after the sampling has been completed. Digital counter means are connected to receive and count the dropout error signals thus developed by all the channels. In a preferred embodiment an appropriate chart recorder may also be connected to receive and record the dropout error signals relative to time distribution. Additionally, a digital counter and chart recorder may be connected in each channel to count dropout error signals within each channel and also record error time distribution over the length of tape being tested.

4 Claims, 2 Drawing Figures

SYSTEM FOR DETECTING DROPOUT AND NOISE CHARACTERISTICS OF MAGNETIC TAPE WITH SWITCH MEANS TO SELECT WHICH CHARACTERISTICS TO BE DETECTED

BACKGROUND OF THE INVENTION

Magnetic tape is very extensively used in modern data processing equipments for the recordation of information, particularly in the form of binary bits of digital data. Customarily, the binary bits are indicated by flux reversals which represent a square wave type of recorded signal. In order to provide greater recording capacity, magnetic tape may be divided into a plurality of channels, each separate channel being employed for the recordation of different data information. Additionally, magnetic tape techniques currently employ relatively high densities of data bits per unit length of the tape as well as high density in the form of multiple channels across the tape. For example, current magnetic tape recording of digital data commonly employed in modern data processing equipments, may comprise eight parallel tracks on a single magnetic tape with a density of 2,400 recorded data bits per lineal inch of magnetic tape; therefore each channel or track of magnetic tape is recorded in a density of 300 data bits per lineal inch.

With this degree of density of recordation, it can be readily appreciated that any slight imperfection in the tape due to faulty manufacture, for example, or damage such as a scratch, can easily cause "dropout" of the data which it is intended to record on one or more channels and over one or more data periods.

The problem of dropout of magnetic tape recording manifestly can adversely affect the accuracy of the information contained within the data which is recorded. Accordingly, it is customary to test magnetic tape to determine its reliability by ascertaining its dropout characteristics as well as its noise characteristics. The latter characteristic, that of noise, can introduce error into the recorded data information by reason of being erroneously detected as data bits when such data bits were not originally recorded on the tape.

For these reasons it has been the practice to test magnetic tape for both dropout and noise characteristics. Most present tape testing equipment consists of a tape recorder designed to include recording and playback capabilities and having, in addition, appropriate detection electronics and counting means. One of the general methods employed in known prior art tape testing equipment, is to record a predetermined and known pattern of data bits on the tape. Customarily such tape has multi-channel recording capabilities and one of the channels is used as a clock channel so that as the tape is played back, the clock channel develops a signal which is employed for a strobe or sampling pulse.

As the recorded tape is played back, the predetermined pattern of data bits is compared with the actual signals developed upon detection by playback. When the original predetermined pattern differs from that which is detected upon playback of the recorded data, an appropriate error signal is generated which is counted in a counter so that a cumulative record of the total errors in the recorded data is developed as the tape is played back.

As previously mentioned, customarily in prior art tape testing equipments, a single channel was employed for developing a strobe or sampling signal. Since a defect in the tape, such as dropout, can occur on the clock track which is relied upon to develop the strobe or sampling signal, any imperfection or damage on the clock track of the tape which causes severe attenuation of the recorded data clock bit will result in a failure to develop the strobe or sampling signal which is employed to sample the comparison of the originally recorded data pattern with the actually recorded data pattern. Thus, errors, such as dropout, for example, in the other tracks or channels may pass undetected by reason of failure to generate one or more strobe or sampling pulses.

Moreover, in known prior art tape testing equipments it is usual to develop a cumulative count of errors which provides no indication of error distribution with respect to time or position along the tape. Conventional chart recorders do not ordinarily have a response which is fast enough to record the detected errors as they occur. The usual speed for recording tape may be of the order of 112 inches per second, for example, with 300 data bits recorded in each inch, and conventional chart recorders are designed to operate at a much slower input signal rate.

Accordingly, there is a need for a more reliable system for testing magnetic tape which obviates the problem of errors introduced by the occurence of dropouts in a clock channel of the recorded data. Additionally, there is a need for a system which is adaptable to recording error distribution with respect to time so that the location of defects or damage on the magnetic tape may be located.

SUMMARY OF THE INVENTION

The present invention comprises a system and method for detecting defects on magnetic tape, such as dropout and noise. The method conceived by the present invention may be practiced in a novel system including a means for recording data bits, preferably represented by magnetic flux reversals at substantially each one-half cycle of uniform data periods or each of a plurality of data channels running parallel along the length of magnetic tape.

Means for separately detecting the recorded data bits on each of the plurality of data channels produces output signals in response to playback of the tape. The output signals developed as a result of the recorded data in each of the channels is separately connected to a bistable means associated with each of the plurality of data channels for producing a predetermined state of the bistable means. Such predetermined state produces a signal which, in turn, inhibits a sampling gate connected with each of the channels to detect each dropout of a data bit as it may occur in each channel.

The output signals of all channels are also connected in common to a means which responds to the first such output signal to occur for producing a timing signal. The timing signal is used for generating a sampling signal delayed by less than one-half of the data period of the originally coded data. The sampling signal provides the second input to its associated channel sampling gate, actuating the sampling gate of its associated channel when such gate is in an non-inhibited condition i.e., the previously mentioned bistable means associated with each channel and the sampling gate within each channel has not been actuated and therefore fails to inhibit the associated channel sampling gate.

From the actuation of a non-inhibited sampling gate, a dropout error signal is produced for that channel indicating the occurence of a dropout of a data bit that was intended to be recorded within that channel. The timing signal is also used to produce a delayed reset signal which is connected to clear each of the bistable means associated with each channel after the sampling, as previously described, has been completed.

This operation is a continuous one and the steps of setting and resetting the bistable means associated with each channel, employing a predetermined output of the bistable means to inhibit each associated channel sampling gate, producing a sampling signal as an input to each sampling gate for generating a dropout error signal when the sampling gate is in a non-inhibited condition, and subsequently resetting the bistable means for each channel after the sampling operation has been completed, is a repetitive, cyclic operation within each data period of the recorded data bits.

An appropriate means such as a digital counter is connected to receive all the dropout error signals to produce a cumulative count, preferably in the form of a visual readout representing the total number of dropouts occuring in all channels of the tape.

Additionally, in a preferered embodiment of the present invention a chart recorder may be provided including appropriate circuitry which accumulates dropout error pulse signals to develop a signal having an amplitude which is a direct function of the accumulated number of pulses. This signal then may be employed to drive the recording on a moving chart so that each step in amplitude on the chart record will reflect one or more dropout errors in the recorded data with respect to time distribution and the position at which such dropout error occured linearly on the magnetic tape.

In a preferred embodiment of the present invention, a digital counter and a chart recorder may be included in each individual channel so that not only the cumulative total dropout error signals are recorded, but a record of such dropout errors is provided for each individual channel, both with respect to cumulative errors, and the time distribution of such errors along the length of the magnetic tape within that particular channel, as well.

The concept of the present invention also provides an appropriate expedient, such as a ganged switch operative in all channels between the bistable means and the sampling gates of the channels, affording means by which the testing system may be employed to detect the noise characteristics of magnetic tape.

This is accomplished by employing one channel for clock bit recording to produce a strobe or sampling pulse, while the remaining channels are rendered non-recording of data. Thus, in all but the clock channel, the playback produces only noise or extraneous signals not due to intentional recording. Such noise signals, upon reaching a predetermined amplitude, are counted as error signals in much the manner of the dropout signals previously described.

Accordingly, it is a primary object of the present invention to provide a method and system for testing magnetic tape which obviates disadvantages of prior art known systems.

It is a most important object of the present invention to provide such a system for testing magnetic tape which records substantially identical repetitive data on each of a plurality of channels and develops a timing signal from the first detected recorded data bit of each data bit period upon playback.

It is another most important object of the present invention to develop both the sampling signal and a reset or clear signal from the aforementioned timing signal so that the operation of the system is essentially timed from the first data bit which is detected within each data period from a plurality of data channels.

Another most important object of the present invention is to provide both a cumulative count of dropout errors and also a record of such errors relative to time distribution along the lineal length of the tape.

Yet another important object of the present invention is to provide such records of errors on a cumulative bases for all channels of recorded data and for each individual channel as well.

A further object of the present invention is to provide such a method and system for detecting dropout errors which is readily and quickly adaptable for detecting noise characteristics of the magnetic tape.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
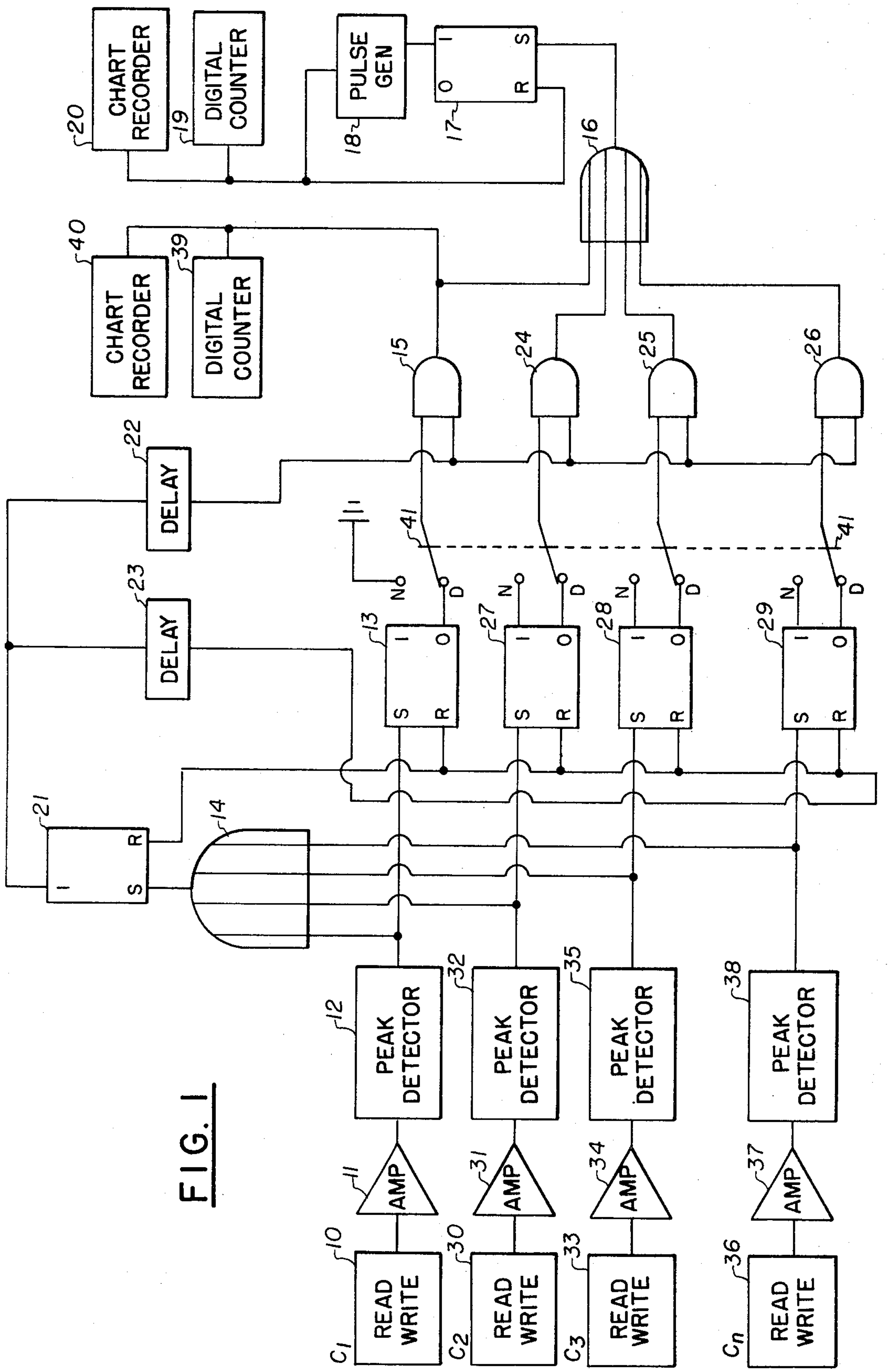
FIG. 1 is a schematic block diagram of a preferred embodiment of the present invention.

In FIG. 1 it will be seen that the concept of the present invention contemplates a magnetic tape divided into and recorded on a plurality of channels which are designated $C_1$, $C_2$, $C_3$, comprising any desired number of channels to $C_n$. Channel 1 includes a read-write means 10 having an appropriate conventional tape transport mechanism for driving the tape at a unifom desired speed. The read-write means 10 is connected to an amplifier 11 which, in turn, provides the input to a peak detector 12.

The peak detector 12 produces an output connected to both a flip-flop 13 and an OR gate 14. The "reset" or "0" output of flip-flop 13 is connected as one of two inputs required to actuate an AND gate 15. Upon actuation, the AND gate generates an output connected to an OR gate 16. The output of the OR gate 16 is connected to a bistable device 17 which may take the form of a flip-flop.

The "set" or "1" output of the flip-flop 17 is connected to a pulse generator 18 which may, for instance, typically by a one-shot multivibrator to develop a desirable form and magnitude of pulse signal. The output of the pulse generator 18 is connected to the reset terminal of the flip-flop 17 so that it can reset or clear that unit.

The same output from the pulse generator 18 is connected as the input to both a digital counter 19 and a chart recorder 20. The output of gate 14 is connected as the input to the "set" terminal of a flip-flop 21 providing a "set" or "1" output to a first delay means 22 which may take the form of a delay one-shot multivibrator; the output of the flip-flop flop 21 also provides the input to a second delay means 23 which similarly may take the form of a delay one-shot multivibrator.

The Output of the first delay means 22, in the form of a pulse developed by the delay one-shot multivibrator, is connected as the second input to the sampling gate 15 and connected in parallel to the remaining sampling gates 24, 25, and 26 associated with channels 2, channel 3, and channel *n*, respectively. The output of the second delay means 23, in the form of a suitable pulse as developed by a delay one-shot multivibrator, for example, is connected to the reset input of the flip-flop 13 and also by parallel connection to the flip-flops 27, 28, and 29 associated with channel 2, channel 3, and channel *n*, respectively.

Channel 2 similarly comprises an appropriate read-write means 30 connected to a suitable amplifier 31 which provides the input to a peak detector 32, all of which units are arranged in a signal path paralleling that of channel 1. In a like manner a similar read-write means 33 is connected to an amplifier 34 and a peak detector 35 to provide a parallel channel 3. Any suitable or desired number of additional channels may be employed within the concept of the present invention as represented by channel n where a like read-write means 36 is connected to provide an additional parallel channel through amplifier 37 and peak detector 38. The AND gates 24 and 25, and 26 associated with channels 2, 3 and *n*, respectively, provide parallel signal paths, all connected to the OR gate 16 the AND gate 15 associated with channel 1 also is connected to provide inputs to a digital counter 39 and a chart recorder 40 to operate in a manner described more fully hereinafter.

OPERATION

The embodiment of the present invention is represented in the schematic illustration of FIG. 1 operates to detect both dropout and noise errors in recorded data bits. Initially the tape is run through the tape transport mechanism of the read-write means comprising elements 10, 30, 33, and 36 in combination to record data bits which may, for example, be represented by magnetic flux reversals at substantially each one-half cycle of predetermined uniform data periods, such as the uniform cyclically repetitive data periods illustrated by waveform A of FIG. 2. Thus, the identical data is recorded on each of the plurality of data channels which, in a typical embodiment, may comprise like channels, for example.

The tape is then played back, being rerun by the tape transport mechanism of the read-write means 10, 30, 33 and 36 and the recorded data is detected, producing output signals representative of the flux changes on the tape. The detected signals are appropriately amplified in the amplifiers 11, 31, 34, 37 of each respective channel. The outputs of the amplifiers are in turn connected to the peak detectors 12, 32, 35 and 38, respectively, wherein the peaks of a preselected type of signal are detected and commensurate pulse signal outputs generated.

The pulse signal outputs of the respective channels 1, 2, 3, through n are connected in common to an OR gate 14 and also as the respective inputs to flip-flops 13, 27, 28 and 29 which form part of channels 1, 2, 3, through *n*, respectively. Since the described inputs are connected to the "set" terminals of the flip-flop 13, 27, 28, and 29, the reception of such signals will provide no output at the "reset" or "0" output of the respective flip-flops. Accordingly, no signal is transmitted from the flip-flops 13, 27, 28, 29 to the respectively associated AND gates 15, 24, 25, and 26 which comprise the sampling means of the present invention. As a result, the sampling gates 15, 24, 25, and 26 are inhibited from actuation by reason of a signal having been detected in each of the respectively associated channels, channel 1, channel 2, channel 3, through channel *n*.

Since the signals developed in the plurality of channels are also connected in common as inputs to the OR gate 14, any such signal developed will provide an output from OR gate 14 connected as a "set" input to a flip-flop 21. Therefore, on the occurence of the first signal developed ib any one of the plurality of channels, the flip-flop 21 is actuated to a "set" condition providing an output of a first delay means 22 and also to a second delay means 23.

The first delay means 22, which may typically take the form of a delay one-shot multivibrator, generates an output, preferably in the form of a pulse signal which is delayed by somewhat less than one-half of the data period of the multiple data bits recorded in each channel. That pulse output from the first delay means is connected as the second input to each of the AND gates 15, 24, 25, and 26.

However, since the AND gates 15, 24, 25, and 26 which are employed for purposes of sampling have been inhibited by the set condition of flip-flops 13, 27, 28, and 29, no output is produced from the sampling gates 15, 24, 25, and 26, and consequently there is no input to OR gate 16. Accordingly, no error is indicated by reason of dropout of a data bit; this is consistent with the fact that a data bit signal was read by the read-write means in each of the channels.

The second delay means 23, which also may take the form of a one-shot multivibrator, provides a pulse output signal delayed by an appropriate amount which must be longer in duration than the delay provided by the first delay means 22 so that a delayed reset signal is supplied to each of the flip-flops 13, 27, 28, and 29 to restore them to the reset condition after the sampling step has been completed.

When one of the read-write means in a particular channel fails to develop an output signal by reason of a dropout or other imperfection in the tape, the system operates in the following manner. Assuming, forexample, that the read-write means 30 in channel 2 does not develop an output signal from playback of the recorded tape during a particular data period, there will be no signal passed through channel 2 to amplifier 31 and the peak detector 32. As a result, flip-flop 27 in channel 2 will remain in its "reset" or "0" output condition, providing one of the two inputs required to actuate the AND gate 24. When the sampling pulse is impressed upon all the sampling AND gates 15, 24, 25, and 26, an output will be produced by sampling gate 24. The output from sampling gate 24 is passed through the OR gate 16, the flip-flop 17, the pulse generator 18, and on to the digital counter 19 and the chart recorder 20, indicating that there has been a dropout at that point in the recorded data.

The recorder 20 may incorporate circuitry responsive to each pulse to generate a commensurately greater amplitude of signal to drive the ordinate displacement of a recording pen. Thus, individual pulses indicating separate dropout errors are not recorded as such but rather the stepped increase of amplitudes in the recorded information indicates the occurrence of dropouts relative to time and lineal distribution along the magnetic tape. Such circuitry, which accommodates the very rapid occurrence of short duration pulses to the much slower operative response of a conventional chart recorder, may constitute a separate unit or be incorporated in the recorder as desired.

The remaining channels, of course, operate in an analogous manner. It will be evident to those skilled and knowledgable in the art that an appropriate digital counter and chart recorder may be connected to the output of AND gate 24 in the same manner as the counter 39 and recorder 40 are connected to the output of AND gate 15 in channel 1. Such an arrangement will record any dropout error in the counter as cumulative sum of all such errors in channel 2 and also record a change in amplitude on the chart recorder indicating the dropout error in that particular channel relative to its time disposition along the length of the recorded tape. A counter and recorder may also be provided for all remaining channels, if desired.

Figure 2:
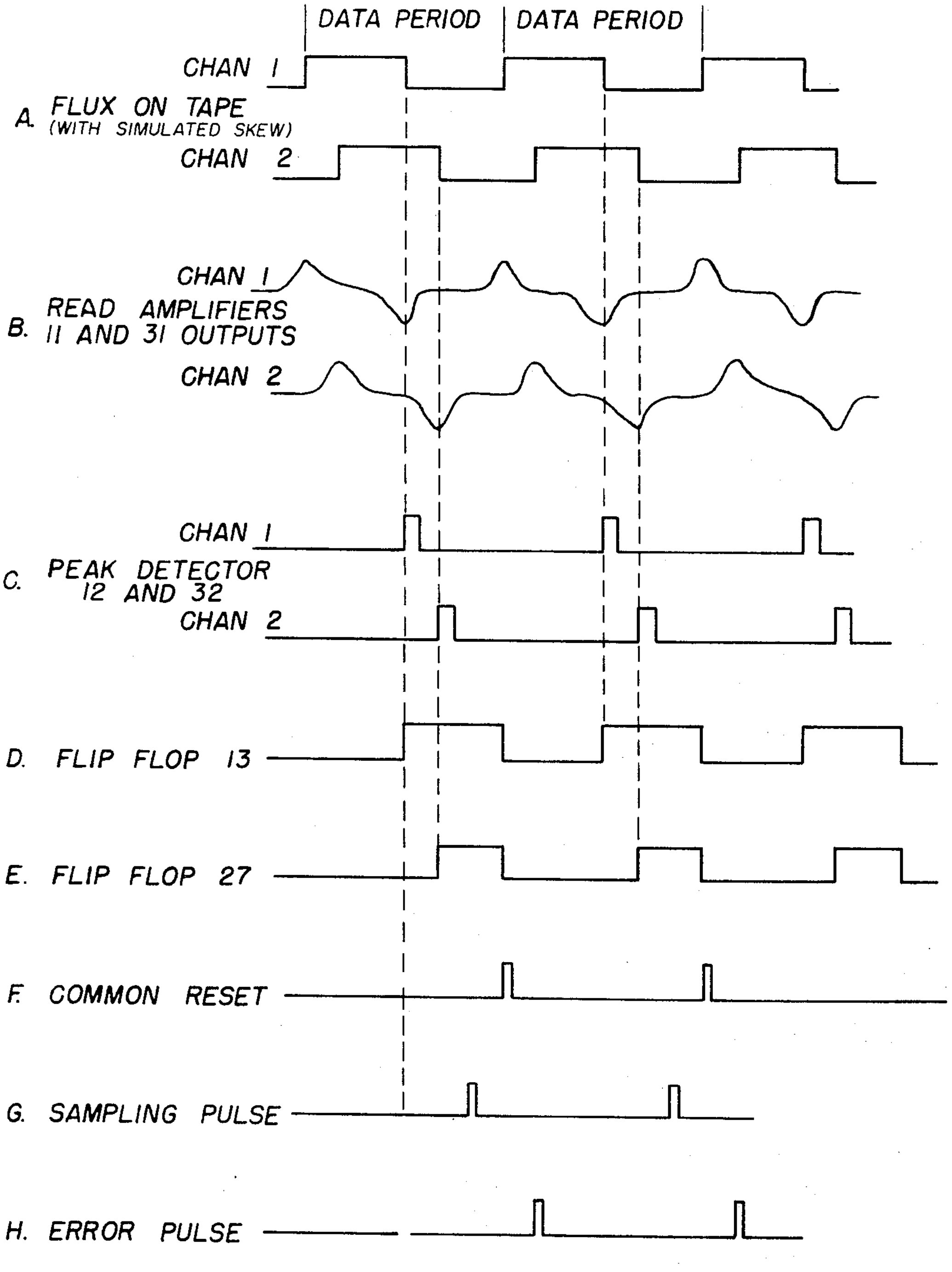
FIG. 2 is a graphical representation of the waveforms of signals developed in the practice of the method and operation of the present invention.

FIG. 2 illustrates waveforms of several signals developed in the operation of a typical embodiment of the present invention such as that illustrated in the schematic block diagram of FIG. 1 and employing the method contemplated by the inventive concept. As has been previously described, the magnetic tape to be tested may be divided into a plurality of channels such as eight channels in a typical instance, each channel being recorded with repetitive data bits usually represented by magnetic flux reversals at predetermined points within pre-established data periods. Typical recorded data is shown in waveforms A of FIG. 2, representing channel 1 and channel 2.

The recorded waveforms for channel 1 and channel 2 are seen to be square waves in character and slightly out of phase with each other. It is not uncommon in recording equipment that, where a plurality of channels are employed, the recorded data on one or more channels is "skewed" relative to the recorded data on other channels. Thus, the waveforms A of FIG. 2 illustrate, in a somewhat exaggerated manner, the way in which recorded data on channel 2 may be "skewed" relative to the recorded data on channel 1. This condition is caused by slight misalignments between the magnetic tape and the tape transport relative to the recording head and is not uncommon even in very high quality recording equipment.

As the tape is played back after having been recorded with data bits represented by magnetic flux reversals at substantially each one-half cycle of data periods on each of a plurality of data channels as illustrated by waveforms A, the read-write means 10 and 30 associated with channels 1 and 2, respectively, develop output signals in response to recorded flux reversals, producing signal waveforms substantially as represented by waveforms B of FIG. 2. These signals are fed to read amplifiers 11 and 31 of channels 1 and 2, respectively, where they are appropriately amplified to provide the inputs to the peak detectors 12 and 32 of channels 1 and 2, respectively.

The peak detectors, as employed in the present invention, are arranged to be responsive to negative-going signals for developing corresponding pulsed outputs as illustrated by waveforms C of FIG. 2. The respective pulsed outputs of peak detectors 12 and 32 are impressed upon the "set" or "1" terminals of flip-flops 13 and 27 to establish their condition as illustrated graphically by waveforms D and E, respectively, of FIG. 2. It will be noted that both flip-flops 13 and 27 are reset by the common reset pulse developed by the delay one-shot multivibrator 23, which latter signal is illustrated by waveform F of FIG. 2.

Thus, it is evident that, the condition of the several flip-flops 13, 27, 28, and 29 responsive to the plurality of channels of the recorded magnetic tape may be changed to the "set" condition at different points in time due to the fact that the recorded signals are slightly "skewed" by reason of minor misalignment of the magnetic tape with the recording head during the process of recording, but the reset signal is simultaneously applied to all the flip-flops so that all the flip-flops such as 13 and 27 operate as illustrated in waveforms D and E to be simultaneously returned to the "reset" or clear condition regardless of the duration of time that such flip-flops may have been in the "set" condition.

As was previously explained, a sampling pulse is developed by the first delay means in the form of the delay one-shot multivibrator 22. In the case of the return-to-bias recording of the character illustrated by waveforms A, magnetic flux reversals occur at substantially each one-half cycle of uniform data periods. The sampling signal is simultaneously applied to all the sampling gates 15, 24, 25, and 26 in the time relationship illustrated by waveform G of FIG. 2.

In one particular embodiment of the present invention, the data period was 42 msec in length and the delay of the sampling pulse of the kind illustrated by waveform G of FIG. 2 was 16 msec. Thus, it may readily be appreciated that flip-flops 13 and 27, for example, will be put into the "set" condition as illustrated by waveforms D and E, producing no output to their respectively associated sampling gates 15 and 24 so that upon reception of the sampling pulse at the sampling gates no output is produced by sampling gate 15, or 24, to be transmitted to the digital counter 19 and the chart recorder 20 indicating dropout.

However, assuming, for example, that no output was produced by the read-write means 30 of channel 2, the flip-flop 27 would remain in its "reset" condition producing an output which is impressed as one of the two inputs required to actuate sampling gate 24. Accordingly, upon the occurrence of the sampling pulse, the two requisite inputs to sampling gate 24 would actuate it to produce an output signal which is, in turn, transmitted to the OR gate 16, flip-flop 17, and the pulse generator 18 to produce an error pulse delayed by an amount approximated by the illustration of waveform H of FIG. 2 to be counted in the digital counter 19 and recorded on the chart recorder 20 as indicative of a dropout error. The same operation, of course, obtains for each of the channels.

The concept of the present invention includes a second mode of operation which tests magnetic tape for noise characteristics. This mode of operation is affected by operation of the ganged switch means 41 which connects one of the two input terminals to the sampling gate 15 of channel 1 to ground while simultaneously exchanging the connections to each of the other sampling gates as 24, 25, and 26 in channels 2, 3, and *n*, respectively, from reception of the "reset" or "0" output of the respectively associated flip-flops 27, 28, and 29 to reception of the "set" or "1" output of those flip-flops.

When magnetic tape is tested for noise characteristics, at least one channel, such as channel 1, for example, is recorded with uniform cyclic data bits to provide a uniformly repetitive clock or sampling signal. Those channels on the tape which are to be tested for noise characteristics do not have any signal recorded upon them, i.e., they are "non recorded" channels. Accordingly, when the tape is played back, the cyclic recorded clock signal is detected and impressed upon the OR gate 14 producing sampling signals and reset signals in the manner previously described in connection with the operation of the equipment as employed for the test for dropout errors.

When a noise signal exceeds a pre-established threshold, the peak detector in that particular channel produces an output which changes the condition of its associated flip-flop, such as the flip-flop 27 in channel 2, for example, from "reset" condition to the "set" condition producing an output which is connected through the ganged switch as an input to its associated sampling gate such as 24, for example, in channel 2. Upon reception of the sampling pulse at the sampling gate 24 in channel 2, an output is produced which is then counted as a noise error much in the same manner as dropout errors are counted and recorded.

On the other hand, if no noise signal is detected during a particular data period in any of the channels, the flip-flops 27, 28, and 29 remain in the "reset" condition no signal is produced, thus inhibiting their associated sampling gates 24, 25, and 26, so that upon the subsequent reception of the sampling pulse, no outputs are produced by sampling gates 24, 25, 26, indicating and confirming that those channels were free of noise within certain pre-established threshold limits.

Accordingly, it will be apparent to those skilled and knowledgable in the pertinent arts that the method and preferred equipment of the present invention is so conceived as to overcome disadvantages of the prior art in the detection of dropout errors on magnetic tape by reason of employing the first detected bit from any one of a plurality of identical recorded channels in order to develop a timing signal of the nature of a clock which, in turn, determines and provides for the generation of appropriately timed sampling and clearing or reset pulses.

Thus, the method and means of the present invention is significantly more reliable than known prior art systems and, moreover, is readily adaptable to the detection of noise characteristics on magnetic tape by the simple and expeditious means of changing a ganged switch such as shown at 41 in FIG. 1.

Those skilled in the art will realize that while the present invention in its method and systems preferably employs simple data bit recording as represented by flux reversals in a return-to-bias manner, any suitable data bits may be recorded in patterns as desired if adaptable within the concept of the system and method of the present invention.

Obviously many modifications and variations of the present invention are possible in the light of the above teachings. It is therefore to be understood that within the scope of the appended claims the invention may be practiced otherwise than ao specifically described.

What is claimed is:

1. A system for selectively detecting dropout and noise on magnetic tape comprising:

means for recording data bits represented by magnetic flux reversals at substantially each one-half cycle of uniform data periods on each of a plurality of data channels of said magnetic tape;

means for detecting the recorded data bits on each of said plurality of data channels and producing output signals responsive thereto;

a bistable means associated with each of said plurality of data channels and each connected to a respective sampling gate, each said bistable means being responsive to each output signal of its respectively associated channel for inhibiting the sampling gate to which it is connected;

means connected to receive the output signals of all channels and responsive to the first received such signal for producing a timing signal;

first delay means responsive to said timing signal for producing a sampling signal delayed by less than one-half of said data period and simultaneously applied to said sampling gates, actuating each non-inhibited sampling gate for producing an error signal;

second delay means responsive to said timing signal for producing a delayed re-set signal connected to clear each said bistable means after said sampling has been completed; and means connected to receive and count said error signals;

said system being adaptable for detecting noise or non-recorded channels of said magnetic tape wherein said means for recording is disabled and at least one additional channel is recorded with repetitive clock sampling signals and including;

switch means operative for disconnecting the sampling gate in the channel having recorded repetitive clock sampling signals and for causing said bistable means associated with each said non-recorded channel to enable its respective sampling gate upon the detection of a noise signal of predetermined amplitude in the channel.

2. A system for detecting dropout and noise on magnetic tape as claimed in claim 1 and including means responsive to said error signals for recording the detected errors relative to time distribution.

3. A system for detecting dropout and noise on magnetic tape as claimed in claim 1 wherein said data comprises digital, return-to-bias bits.

4. A system for detecting dropout and noise on magnetic tape as claimed in claim 3 wherein said output signals are developed from each negative-going signal of the recorded data.

* * * * *